(12) United States Patent
Kinme et al.

(10) Patent No.: US 7,275,458 B2
(45) Date of Patent: Oct. 2, 2007

(54) TILT STEERING ASSEMBLY

(75) Inventors: Shigetaka Kinme, Kashihara (JP); Kenichi Aota, Nara (JP)

(73) Assignee: Jtekt Corporation, Osaka (JP)

( * ) Notice: Subject to any disclaimer, the term of this patent is extended or adjusted under 35 U.S.C. 154(b) by 287 days.

(21) Appl. No.: 10/867,224

(22) Filed: Jun. 15, 2004

(65) Prior Publication Data
US 2005/0016314 A1 Jan. 27, 2005

(30) Foreign Application Priority Data
Jun. 18, 2003 (JP) .............................. 2003-173880

(51) Int. Cl.
*B62D 1/18* (2006.01)
*H02K 7/02* (2006.01)
*H02K 5/00* (2006.01)

(52) U.S. Cl. .................... 74/493; 280/775; 310/71; 310/89

(58) Field of Classification Search ............... 74/492, 74/493, 388 PS; 180/444; 280/779, 775
See application file for complete search history.

(56) References Cited
U.S. PATENT DOCUMENTS
5,056,818 A 10/1991 Sadakata 6,019,391 A * 2/2000 Stuedemann et al. ........ 280/779
6,913,108 B2 * 7/2005 Ikeda .......................... 180/444
6,990,874 B2 * 1/2006 Murakami et al. ............ 74/493
2002/0066333 A1 6/2002 Ryne et al.

FOREIGN PATENT DOCUMENTS
DE 0303147 A1 * 8/1988
EP 1 195 313 A2 4/2002
JP 62-15082 1/1987

* cited by examiner

*Primary Examiner*—Richard Ridley
*Assistant Examiner*—James Pilkington
(74) *Attorney, Agent, or Firm*—Rabin & Berdo, PC

(57) ABSTRACT

A tilt steering assembly includes a support shaft extended along a tilt central axis. The support shaft is conductively assembled to a steering column and is unitarily rotated with the steering column during tilt adjustment. A resilient conductive member is interposed between a conductive end member provided at an end of the support shaft and a conductive fixed side plate including a support hole for supporting the support shaft. The steering column is grounded via the support shaft, the end member, the conductive member and the fixed side plate.

15 Claims, 8 Drawing Sheets

TILT STEERING ASSEMBLY

BACKGROUND OF THE INVENTION

1. Field of the Invention

The present invention relates to a steering assembly for use in automotive vehicles and the like.

2. Description of Related Arts

As a shock-absorbing steering assembly, there have heretofore been known a steering assembly wherein a bolt is inserted through a tubular intermediate member insulatively retaining a break-away bracket, a conducting washer extended from the break-away bracket and a steering support member, so that the intermediate member, the washer and the steering support member are integrally fastened between a head of the bolt and a nut threadedly engaged with a distal end of the bolt (Japanese Unexamined Utility Model Publication No. 62-15082).

In this case, the break-away bracket is grounded to a vehicle body by means of the washer, the intermediate member and the steering support member.

In another case, the break-away bracket and the washer may be provided as separate members, which may be electrically interconnected by means of a wire harness.

The aforesaid conducting washer is unable to establish conduction unless the washer is strongly clamped between the intermediate member and the nut.

Therefore, the aforementioned grounding structure using the aforesaid conducting washer is not applicable to a tilt steering assembly for establishing the conduction between members associated with a tilt support shaft and adapted to move relative to each other.

In the case where the wire harness is used to interconnect the members moved relative to each other during tilt adjustment, the wire harness must have such a length as to be sufficient for permitting the tilt adjustment. In a case where the members movable relative to each other are surrounded by a limited space, therefore, it is difficult to lay out the wire harness.

It is an object of the invention to provide a tilt steering assembly adapted for positive accomplishment of the electrical connection between the members movable relative to each other and for installation in the limited space.

SUMMARY OF THE INVENTION

For achieving the above object, one embodiment of the invention provides a tilt steering assembly comprising a steering column permitting tilt adjustment around a tilt central axis. The tilt steering assembly comprises: a conductive support shaft extended along the tilt central axis, conductively assembled to the steering column, and integrally rotated with the steering column during tilt adjustment; a conductive end member provided at an end of the support shaft; a conductive fixed side plate including a support hole for supporting the support shaft via an insulating member; and a conductive member interposed between the fixed side plate and the end member and having resilience for bringing the fixed side plate and the end member into conduction. The steering column is grounded by means of the support shaft, the end member, the conductive member and the fixed side plate.

According to the embodiment, the electrical connection (e.g., ground connection, as mentioned above) between the support shaft and the fixed side plate by means of the conductive member is favorably maintained even when the support shaft and the fixed side plate are moved relative to each other in conjunction with the tilt adjustment. As a result, the steering column can be positively grounded to the vehicle body. Since the conductive member is interposed between the end member at the end of the support shaft and the fixed side plate, it is easy to lay out the steering assembly even if the support shaft is surrounded by a limited space.

BRIEF DESCRIPTION OF THE DRAWINGS

FIG. 4A is a side view of a conductive member whereas

DETAILED DESCRIPTION OF THE PREFERRED EMBODIMENTS

Figure 1A:
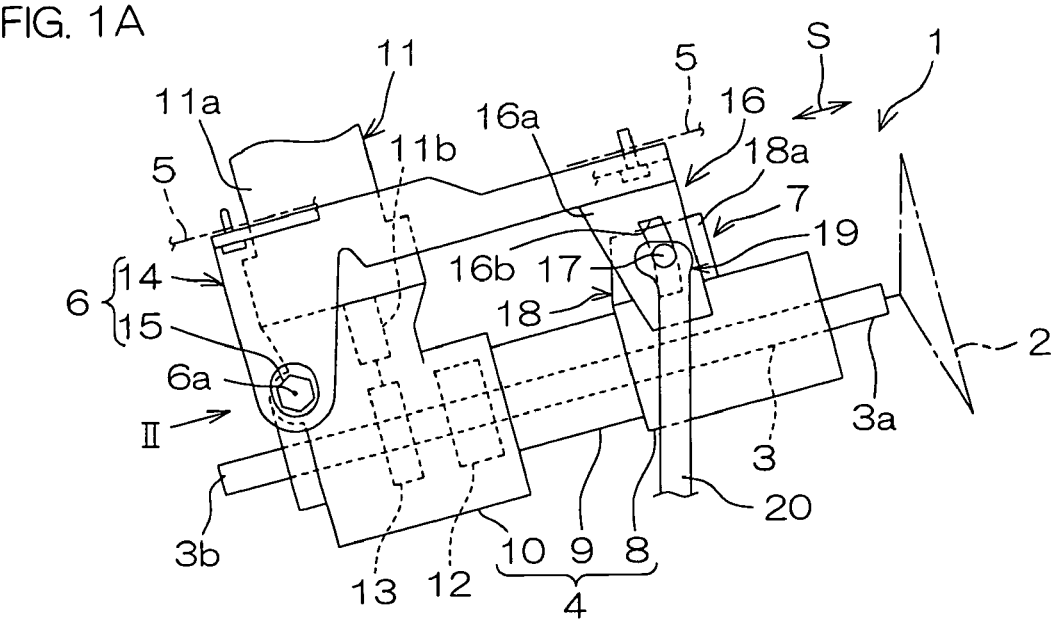
FIGS. 1A, 1B and 1C are side views, each schematically showing an electric power steering assembly as a tilt steering assembly according to one embodiment of the invention, FIG. 1A showing a state where the tilt of a steering wheel is adjusted to an intermediate position, FIG. 1B showing a state where the tilt of the steering wheel is adjusted to an upper position, FIG. 1C showing a state where the tilt of the steering wheel is adjusted to a lower position.

A tilt steering assembly according to one embodiment of the invention will hereinbelow be described with reference to the attached drawings. FIG. 1A is a side view schematically showing the general arrangement of an electric power steering assembly of the invention. FIG. 1A is referred to.

The electric power steering assembly 1 includes: a steering shaft 3 for transmission of a steering torque applied to a steering wheel 2 to steer road wheels (not shown); and a steering column 4 for rotatably supporting the steering shaft 3 extended therethrough. One end 3a of the steering shaft 3 is connected to the steering wheel 2, whereas the other end 3b thereof is connected to a steering mechanism via an unillustrated intermediate shaft and the like, the steering mechanism operative to steer the road wheels. When the steering wheel 2 is operated, the steering torque thereof is transmitted to the steering mechanism via the steering shaft 3 and the like, so that the road wheels can be steered.

The electric power steering assembly 1 is assembled to a vehicle-side member 5 (partially indicated by a dot-dash line) in a position where the steering wheel 2 is positioned upwardly so that a longitudinal length S of the steering column 4 is angled with respect to an anteroposterior direction of the vehicle.

The electric power steering assembly 1 includes: a tilt hinge mechanism 6 providing for pivotal support of a lower part of the longitudinal length S of the steering column 4 from the vehicle-side member 5; and a support mechanism 7 providing for switchable support of a central part of the longitudinal length S of the steering column 4 from the vehicle-side member 5, the switchable support wherein the position of the central part is switched between a locked position and an unlocked position.

Figure 1B:
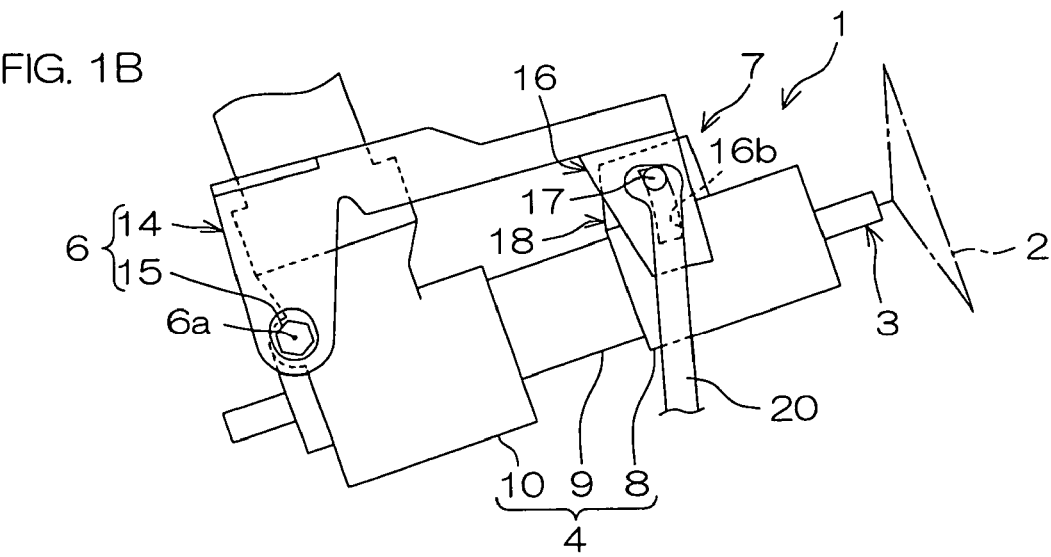
Figure 1C:
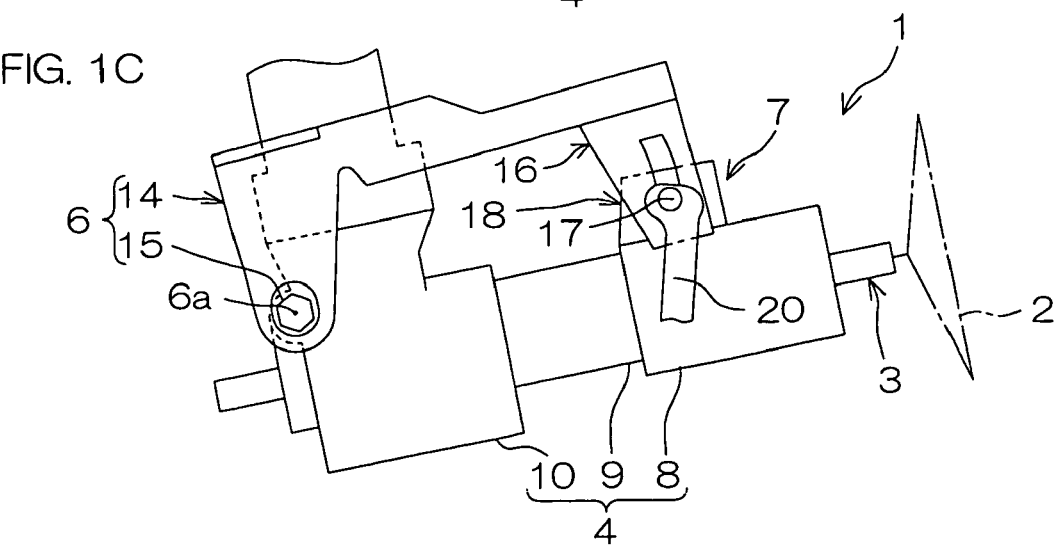

In the unlocked state, the electric power steering assembly 1 functions as a tilt steering assembly. As shown in FIGS. 1B and 1C, the tilt steering assembly provides the height adjustment of the steering wheel 2 by pivotally moving the steering column 4 around a tilt central axis 6a of the tilt hinge mechanism 6.

While the embodiment is described by way of reference to a case where the tilt hinge mechanism 6 is applied to the electric power steering assembly 1, the tilt hinge mechanism 6 may also be applied to a manual steering assembly.

Returning to FIG. 1A, the steering column 4 includes: an upper tube 8 located at an upper part of the longitudinal length S thereof; a lower tube 9 located centrally of the longitudinal length S thereof; and a housing 10 located at a lower part of the longitudinal length S and fixed to the lower tube 9.

The electric power steering assembly 1 includes: a torque sensor 12 associated with the steering shaft 3 for sensing a steering torque; an electric motor 11 for generating a steering assist force based on an output signal from the torque sensor 12, a vehicle speed signal and the like; and a reduction mechanism 13 for reducing the speed of rotation of a rotary shaft 11b of the electric motor 11.

When the steering wheel 2 is operated, the steering torque thereof is detected by the torque sensor 12 whereas the electric motor 11 generates the steering assist force based on the detected torque, the detected vehicle speed and the like. The steering assist force is transmitted to the steering shaft 3 via the reduction mechanism 13 so as to be transmitted to the steering mechanism in conjunction with the motion of the steering wheel 2. Thus, the road wheels are steered. The electric power steering assembly 1 comprises a motor housing 11a of the electric motor 11 assembled to the housing 10 of the steering column 4, the electric motor operating to provide the steering assist. The housing 10 of the steering column 4 and the motor housing 11a of the electric motor 11 are formed of a metal member as a conductive member, such as an aluminum alloy member. The housing 10 of the steering column 4 and the motor housing 11a of the electric motor 11 are mechanically connected with each other by means of a screw, for example. Furthermore, the steering column housing 10 and the motor housing 11a are electrically connected with each other via a pair of contact portions thereof (not shown in FIG. 1A) on which the housings 10 and 11a contact each other.

The housing 10 accommodates and supports the reduction mechanism 13 and the torque sensor 12. The tilt hinge mechanism 6 is assembled to the housing 10. There may be a case, as shown in FIG. 1A, where the housing 10 comprises a single member unitizing a first housing accommodating the torque sensor 12 and a second housing accommodating the reduction mechanism 13. In an alternative case, the first and second housings may be combined with each other to form the housing 10.

In order to provide for the support of the housing 10 of the steering column 4 from the vehicle-side member 5, the tilt hinge mechanism 6 includes: a lower fixed bracket 14 fixed to the vehicle-side member 5; and bolts 15 constituting a pair of tilt support shafts, which are mounted to the housing 10 as rotatably supported by the lower fixed bracket 14. The tilt hinge mechanism 6 is mounted to lateral opposite sides of the steering column 4 in a similar fashion.

The support mechanism 7 includes: an upper fixed bracket 16 fixed to the vehicle-side member 5; a support shaft 17 supported by an elongate hole 16b in a side plate 16a of the upper fixed bracket 16; an upper bracket 18 fixed to the upper tube 8 of the steering column 4 as supported by the support shaft 17; and a lock mechanism 19 provided at the support shaft 17 for releasably locking the position of the steering column 4.

The lock mechanism 19 includes: a cam mechanism (not shown) for pressing the corresponding side plates 16a, 18a of the brackets 16, 18 against each other; and an operation lever 20 for operating the cam mechanism. In the unlocked state, the tilt hinge mechanism 6 permits the tilting motion of the steering column 4.

Figure 2:
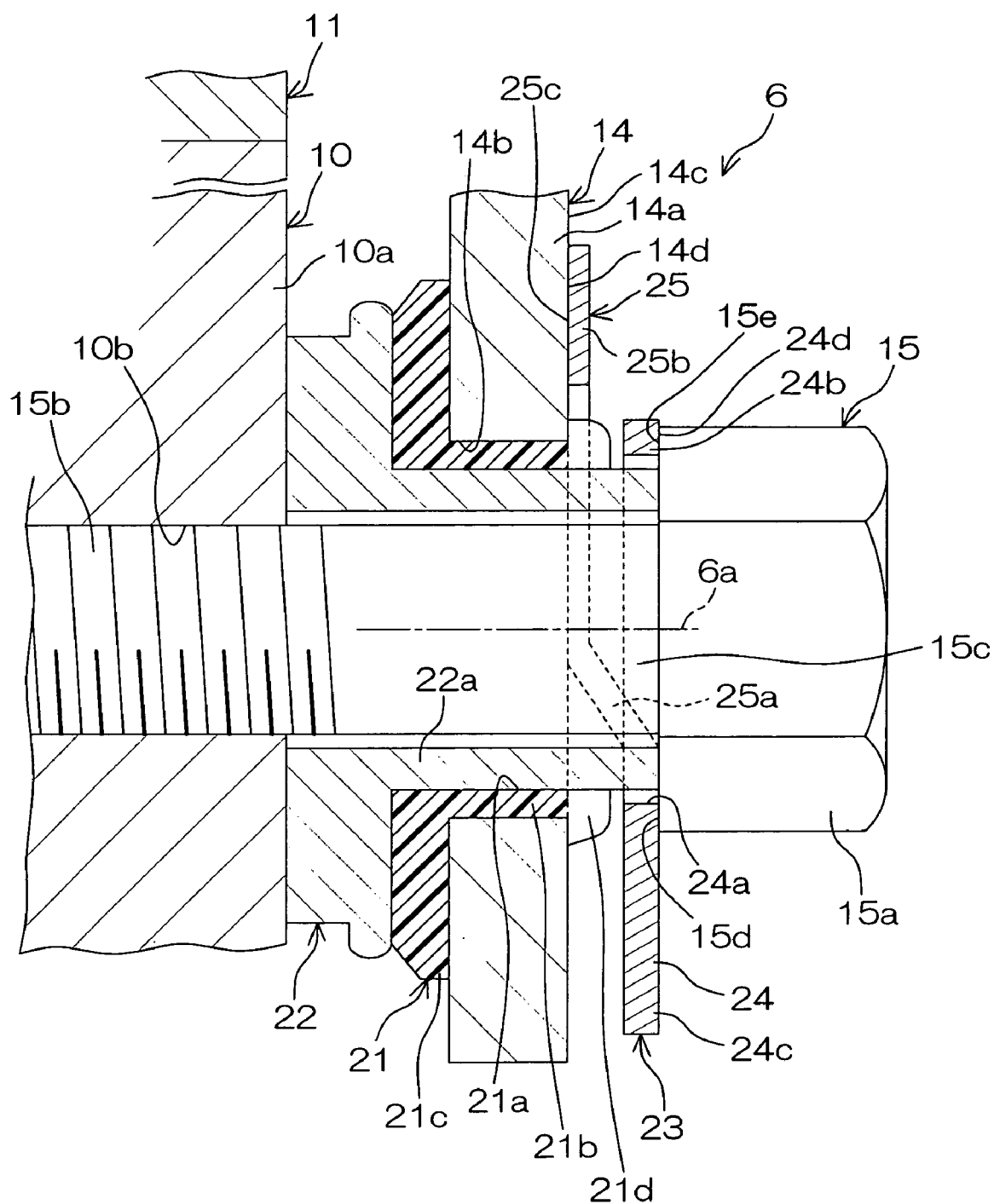
FIG. 2 is a schematic sectional view of a tilt hinge mechanism as viewed along the direction II in FIG. 1.
Figure 3:
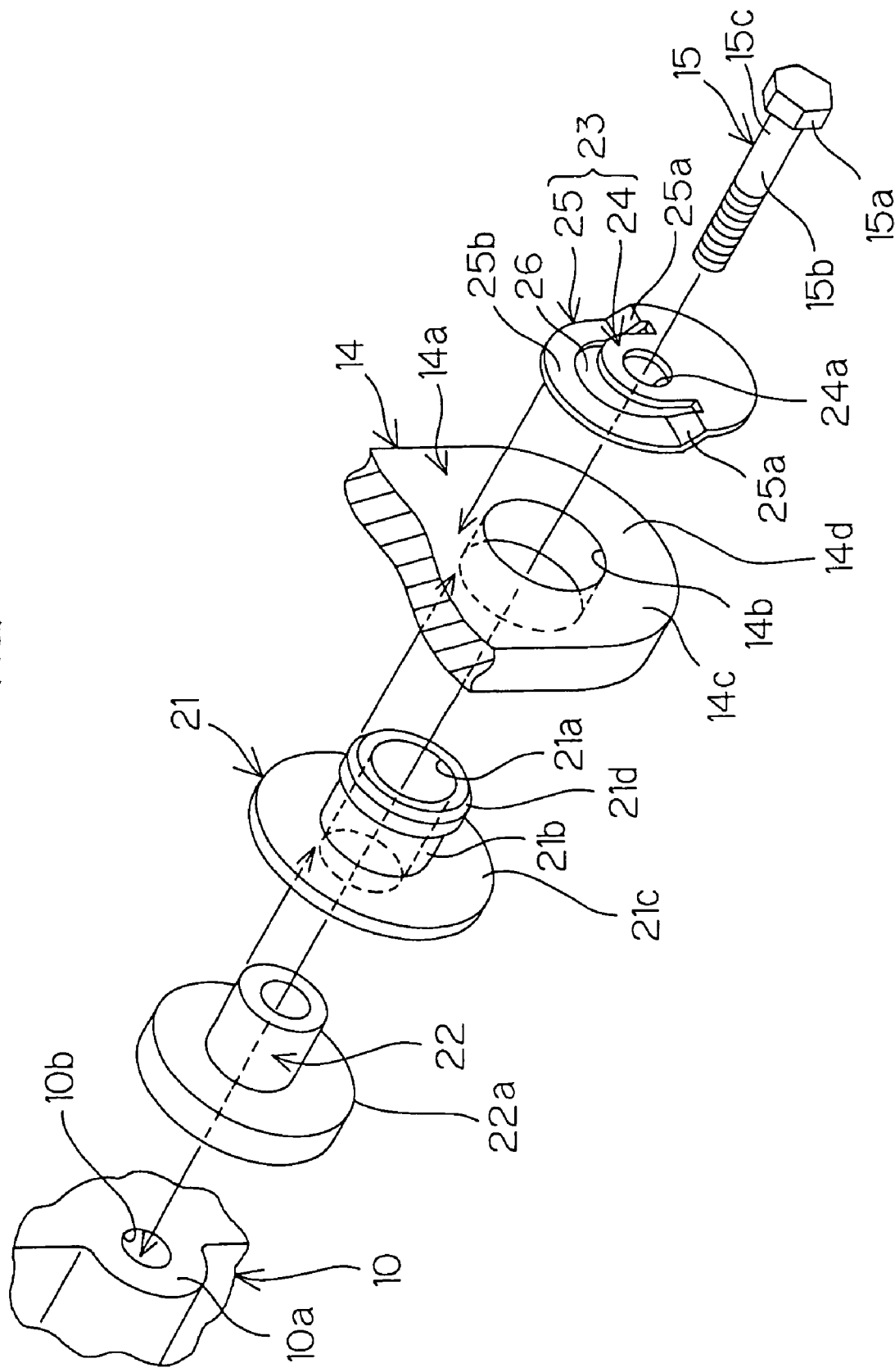
FIG. 3 is an exploded perspective view of the tilt hinge mechanism of FIG. 2.

FIGS. 2 and 3 are referred to. FIGS. 2 and 3 show the tilt hinge mechanism 6 disposed on one of the lateral sides of the steering column 4.

The bolt 15 of the tilt hinge mechanism 6 is constituted by, for example, a hexagon head bolt which is formed of a metal member as a conductive member, such as a steel member. The bolt 15 includes a head 15a, and a threaded shank 15b formed with a male thread. The head 15a constitutes an end member provided at an end 15c of the threaded shank 15b. The aforesaid tilt axis 6a is defined by an axis of the threaded shank 15b of the bolt 15.

The housing 10 of the steering column 4 includes: a pair of side portions 10a in opposing relation; and a pair of screw holes 10b each formed, as a fixing portion, in each of the pair of side portions 10a. The bolt 15 is screwed into each of the screw holes 10b so that each bolt 15 and the housing 10 are electrically connected with each other.

The lower fixed bracket 14 is fixed to the vehicle-side member 5. The lower fixed bracket 14 includes: a pair of fixed side plates 14a; and a pair of support holes 14b each formed in each of the fixed side plates 14a. Each side plate 14a is disposed in face-to-face relation with an outer side of the corresponding side portion 10a of the housing 10. Each bolt 15 extends through the corresponding support hole 14b to be screwed into the corresponding screw hole 10b of the housing 10.

According to the embodiment, the tilt hinge mechanism 6 further includes: a pair of bushes 21, as an insulating member, each mounted in each of the pair of support holes 14b of the lower fixed bracket 14; a pair of collars 22 each relatively rotatably fitted in a corresponding one of holes 21a of the pair of bushes 21; and a pair of conductive members 23 for establishing electrical connection between the steering column 4 and the vehicle-side member 5.

The collar 22 is formed of a metal member as a hard member. The collar 22 includes: a tubular portion 22a through which the threaded shank 15b of the bolt 15 is inserted; and an annular flange 22b formed at an end of the tubular portion 22a and extended radially outwardly therefrom. The collar 22 is clamped between the side portion 10a of the housing 10 of the steering column 4 and the head 15a of the bolt 15. When tilt adjustment is made, the collar 22 is turned in unison with the housing 10 and the bolt 15.

The bush 21 is formed of a synthetic resin member such as to be able to rotate relative to the collar 22 with low friction. The bush 21 includes: a tubular portion 21b formed with the hole 21a on an inner side thereof; a flange 21c radially outwardly extended from one end of the tubular portion 21b; and a greater diameter portion 21d formed on an outside circumference of the other end of the tubular portion 21b. The flange 21c is interposed between the fixed side plate 14a of the lower fixed bracket 14 and the side portion 10a of the bracket 10 so as to keep the fixed side plate 14a and the side portion 19a out of contact.

An outer periphery of the tubular portion 21b is fitted in an inner periphery of the support hole 14b in the fixed side plate 14a of the lower fixed bracket 14. An outside diameter of the greater diameter portion 21d is greater than an outside diameter of the support hole 14b. The flange 21c and the greater diameter portion 21d are located on the opposite sides of the fixed side plate 14a, which define circumferential edges of the support hole 14b, whereby the bush 21 is prevented from disengaging from the support hole 14b.

A seat 15d of the head 15a of the bolt 15 and an outside surface 14c of the fixed side plate 14a of the lower fixed bracket 14 define opposite faces in face-to-face relation. A predetermined amount of gap is defined between the seat 15d and the outside surface 14c as the opposite faces. The conductive member 23 is disposed in the gap as resiliently deformably clamped between these faces.

Figure 4A:
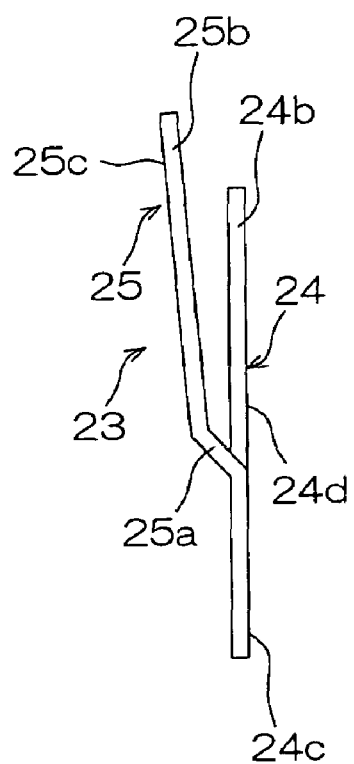
Figure 4B:
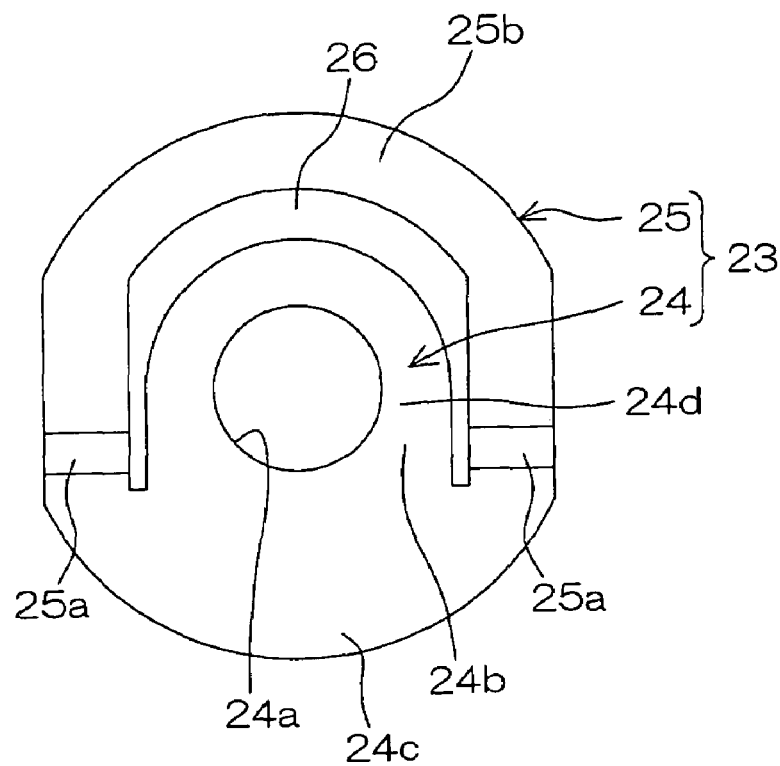
FIG. 4B is a front view of the conductive member.

FIGS. 2, 4A and 4B are referred to. The conductive member 23 is formed of a metal material as a conductive material, such as a spring steel, thus having resilience. Specifically, the conductive member 23 includes: a main body 24 having a through hole 24a for insertion of the bolt 15 therethrough; and a resilient piece (U-shaped portion) 25 extended from the main body 24 and resiliently supported by the body. In an assembled state shown in FIG. 2, the main body 24 is positioned close to the head 15a of the bolt 15 whereas the resilient piece 25 is positioned close to the fixed side plate 14a of the lower fixed bracket 14.

The conductive member 23 comprises a sheet metal article unitizing the main body 24 and the resilient piece 25, the resilient piece 25 formed by cutting a portion of the sheet metal article and bending out the cut portion. As seen in a plan view of FIG. 4B, the conductive member 23 includes a slit 26 defined in a U-shape between the main body 24 and the resilient piece 25 in order to permit relative movement between the resilient piece 25 and the main body 24.

Referring to FIGS. 4A and 4B showing a free state of the conductive member 23, the main body 24 includes: a first annular portion 24b located substantially centrally of the conductive member 23 as seen in plan and defining a circumferential portion of the through hole 24a; and a second portion 24c defining a semi-circle having a greater diameter than the first portion 24b and continuous to the first portion 24b. The first portion 24b and the second portion 24c are formed flush with each other. The first portion 24b of the main body 24 includes a contact portion 24d adapted to contact a contact portion 15e defined at the seat 15c of the head 15a of the bolt 15 so as to establish electrical connection therewith.

The resilient piece 25 comprises a U-shaped portion which is extended from opposite sides of the second portion 24c of the main body 24 to define a U-shape (depicted as an inverted U in FIG. 4B) and is supported by the main body 24 in a straddle mounting fashion. The resilient piece 25 opposes to a circumference of the first portion 24b of the main body 24 via the slit 26. The resilient piece 25 in a free state is configured as a two-step bent, including a first portion 25a defining a pair of ends continuous to the second portion 24c of the main body 24 and inclining relatively steeply; and a second portion 25b defining a U-shaped intermediate portion interconnecting these first portions 25a and inclining relatively gently. The resilient piece is yieldable as resiliently deformed to vary the inclinations of the portions 25a, 25b thereof.

The resilient piece 25 establishes electrical connection with the outside surface 14c of the fixed side plate 14a by resiliently bringing its contact portion 25c defined at the second portion 25b thereof into face contact with a contact portion 14d defined by a circumferential portion of the support hole 14b (see FIG. 2).

In the assembled state shown in FIG. 2, the conductive member 23 is so clamped as to be resiliently deformed along an axial direction of the bolt 15. In a state where the second portion 25b of the resilient piece 25 is substantially parallel with the main body 24, the contact portion 24c of the main body 24 resiliently contacts the corresponding head 15a of the bolt 15, while the contact portion 25c of the second portion 25b of the resilient piece 25 resiliently contacts the corresponding fixed side plate 14a of the lower fixed bracket 14. In this state, the conductive member 23 is capable of applying oppositely directed biasing forces such as to bias the head 15a and the fixed side plate 14a away from each other.

Returning to FIG. 2, the embodiment of the invention is arranged such that the bolt 15 can establish the electrical connection with the housing 10 of the steering column 4 as assembled thereto.

Even when the bolt 15 and the fixed side plate 14a of the lower fixed bracket 14 are moved relative to each other so as to vary the gap therebetween, the conductive member 23 can assuredly accomplish the resilient contact with the head 15a of the bolt 15 and with the fixed side plate 14a of the lower fixed bracket 14. That is, the conductive member may be stably held in sliding contact or pressure contact with the head 15a and with the fixed side plate 14a. Thus, the conductive member can ensure the electrical connection between the bolt 15 and the lower fixed bracket 14. Therefore, the electrical connection between the lower fixed bracket 14 and the vehicle-side member 5 to which the bracket is fixed, and between the lower fixed bracket and the steering column 4 can be accomplished assuredly.

Furthermore, the vehicle-side member 5 can be electrically connected with the motor housing 11a of the electrical motor 11 by means of the lower fixed bracket 14, the conductive member 23, the bolt 15 and the housing 10 of the steering column 4.

In addition, the conductive member 23 is mostly incorporated in the tilt hinge mechanism 6 and hence, the conductive member does not interfere with components disposed in a surrounding space even when the surrounding space is limited. This leads to an easy layout of the conductive member 23.

The conductive member 23 may be assembled utilizing an operation of mounting the bolt 15 to the housing 10, the operation essentially required for assembling the tilt hinge mechanism 6. This obviates an operation of mounting the conductive member 23.

The main body 24 and the resilient piece 25 resiliently contact the respectively corresponding head 15a of the bolt 15 and fixed side plate 14a of the lower fixed bracket 14, thereby more positively accomplishing the electrical connection. In addition, the main body 24 including the through hole 24a for insertion of the bolt 15 therethrough is configured to be temporarily retained on the bolt 15 during assembly. Therefore, the conductive member may be readily clamped and assembled.

The resilient piece 25 is supported in the straddle mounting fashion such that the resilient piece 25 may be brought into a more stable contact than in a case where the resilient piece 25 is supported in a cantilever fashion. Hence, the resilient piece can even more assuredly accomplish the electrical connection.

Since the resilient piece 25 comprises the U-shaped portion, the resilient piece 25 may be disposed in a small space around the bolt 15 and besides, an increased area may be involved in the electrical connection.

The head 15a of the bolt 15 and the main body 24, as well as the second portion 25b of the resilient piece 25 and the fixed side plate 14a are brought into face contact with each other. More preferably, the surfaces of the sheet metal article constituting the conductive member 23 conform to the counterpart members, such as the head 15a and the fixed side plate 14a, so that these components are less likely to be caught during the relative sliding movement. This results in the reduction of sliding resistance.

The second portion 25b of the resilient piece 25 is extended substantially along a circumferential direction of the bolt 15 and in a direction perpendicular to a direction in which the second portion 25b is clamped between the head 15a and the fixed side plate 14a. Therefore, the second portion 25b may be reduced in the sliding resistance as subjected to the clamping force. As a result, the tilt adjustment may be accomplished with less force.

The conductive member 23 may be assembled easily by using the bolt 15. In addition, the bolt 15 may employ, for example, a commercially available bolt which is less costly. This results in the further cost reduction of the tilt hinge mechanism 6.

Since the conductive member 23 is adapted for resilient contact against the fixed side plate 14a and the head 15a, the conductive member can accommodate dimensional errors, assembly errors and such. Furthermore, the conductive member 23 may have the pressing force against the counterpart member set to a substantially low constant value and hence, the sliding resistance during the tilt adjustment can be reduced.

Where the conductive member 23 is composed of a single sheet metal article, the conductive member may be produced at lower costs. For instance, the conductive member may be produced at lower costs than a conventional wire harness.

The conductive member 23 may preferably be applied to the electric power steering assembly, or more preferably to the electric power steering assembly wherein the motor housing 11a of the electric motor 11 for providing the steering assist is assembled to the housing 10 of the steering column 4. Specifically, the motor housing 11a of the electric motor 11 is electrically connected with the vehicle-side member 5 and grounded thereto by means of the conductive member 23. Therefore, the motor housing 11a thus grounded is capable of shielding electromagnetic wave occurring in the electric motor 11. As a result, the energized electric motor 11 may be prevented from causing noises of an automotive radio.

The tilt hinge mechanism 6 including the conductive member 23 may be applied not only to the electric power steering assembly 1 but also to a case where the steering column 4 is utilized as a part of an electric circuit, thereby ensuring that the function of the electric circuit is fully exhibited.

Other embodiments of the invention will be illustrated as below. In the following description, like parts to those of the embodiment of FIG. 3 are represented by like reference characters, respectively, the description of which is dispensed with.

Figure 5:
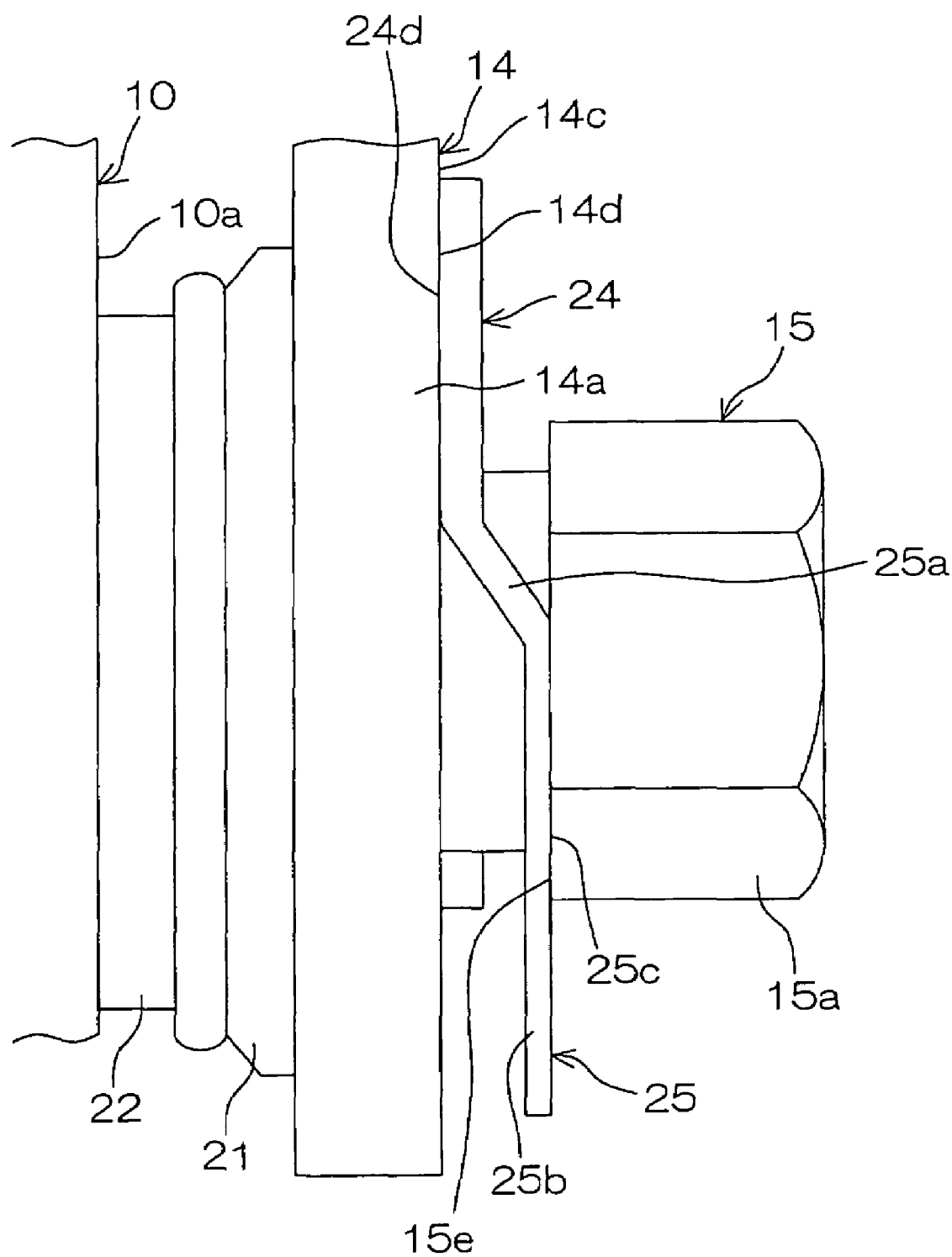
FIG. 5 is a schematic side view of a tilt hinge mechanism according to another embodiment hereof.

As shown in FIG. 5, there may be a case where the main body 24 of the conductive member 23 contacts the fixed side plate 14a while the resilient piece 25 thereof contacts the head 15a of the bolt 15.

Figure 6:
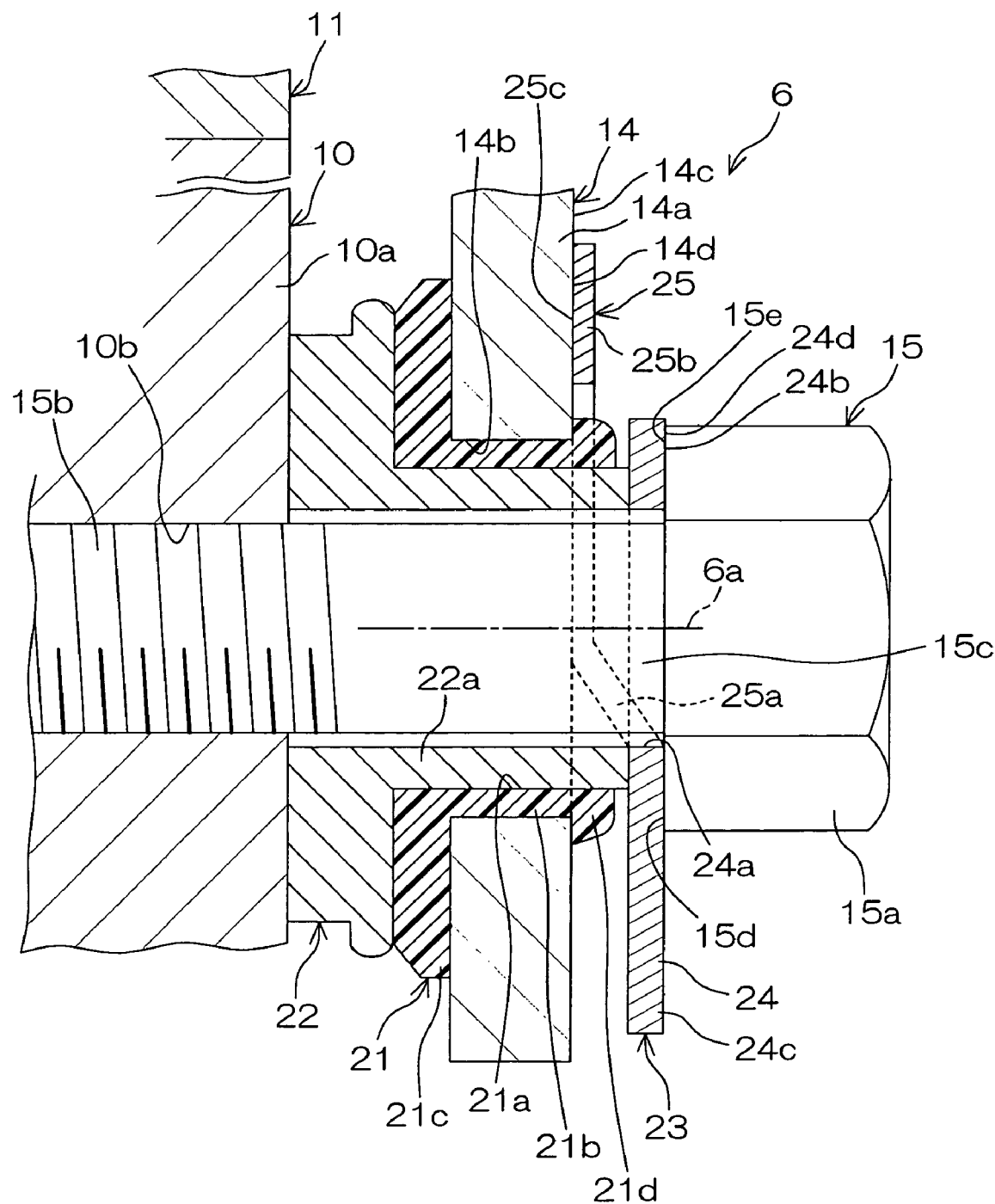
FIG. 6 is a schematic sectional view of a tilt hinge mechanism according to still another embodiment hereof.

As shown in FIG. 6, there may be a case where the main body 24 of the conductive member 23 is clamped between the collar 22 and the head 15a of the bolt 15 while only the second portion 25b resiliently contacts the fixed side plate 14a.

Although not shown in a figure, there may be a case where only the main body 24 of the conductive member 23 is resiliently pressed against the head 15a. In another case, the main body 24 of the conductive member 23 may cantilever the resilient piece 25. The bolt 15 as the tilt support shaft may be replaced by a column member formed with a greater diameter portion as an end member, the column member assembled to the side portion 10a of the housing 10 by press fit or the like.

Figure 7:
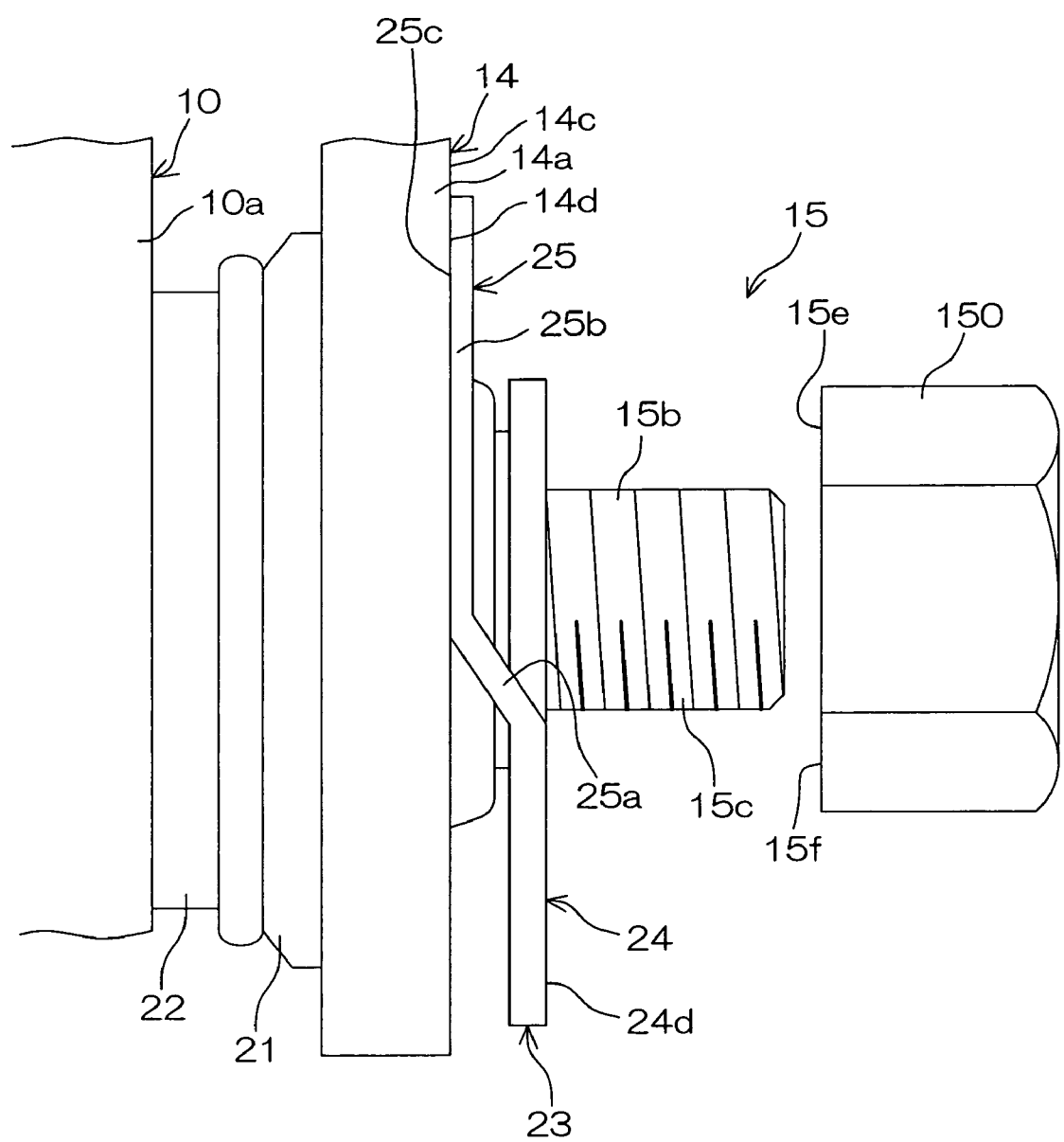
FIG. 7 is an exploded side view of a tilt hinge mechanism according to still another embodiment hereof.

As shown in FIG. 7, there maybe a case where a nut 150 is employed as the end member which threadedly engages the end 15c of the threaded shank 15b. FIG. 7 shows the contact portion 15e and also shows a portion 15f on the diametrically opposite face of the nut 150 which contacts the contact portion 24d of the conductive member 23.

It may be considered to omit the bush 21 and the collar 22. In this case, as well, the conductivity can be enhanced by the conductive member 23.

Figure 8A:
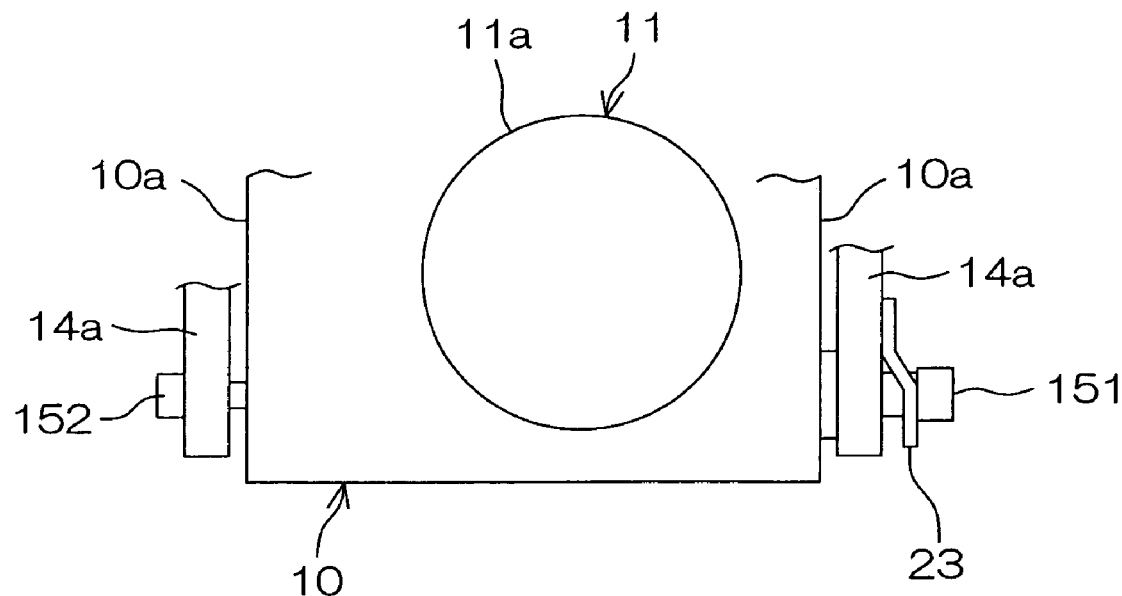
FIG. 8A is a schematic plan view showing an electric power steering assembly as a tilt steering assembly according to still another embodiment hereof.
Figure 8B:
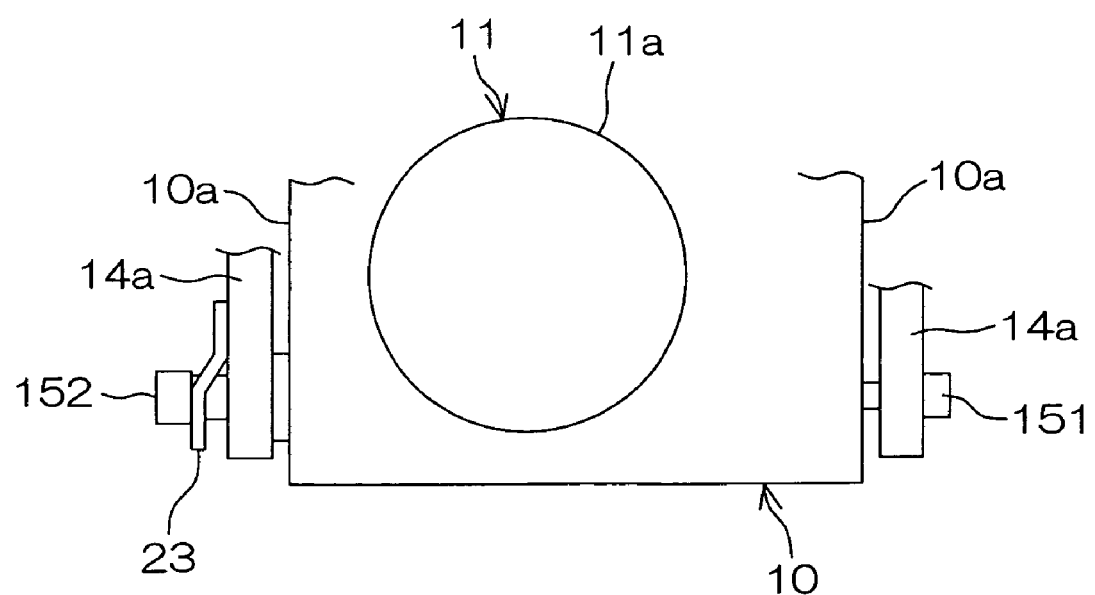
FIG. 8B is a second schematic view.

As shown in FIG. 8A and FIG. 8B, the conductive member 23 may be provided in association with only one of the pair of bolts 151, 152 as the tilt support shafts. In the case of FIG. 8A, the conductive member 23 may preferably be disposed at the bolt 151 (the right-hand bolt 151 as seen in FIG. 8A) which is relatively closer to the motor housing 11a of the electric motor 11. Thus is reduced a distance between the motor housing 11a of the electric motor 11 and the conductive member 23, so that the conductivity may be increased for effective noise reduction. FIG. 8B illustrates that motor housing 11 is positioned relatively closer to the bolt 152 (the left-hand support shaft as seen in FIGS. 8A and 8B), and the conductive member 23 is provided to the bolt 152 which is used as a support shaft, again with shortening of the electrical path and reduced noise.

While the invention has been described in details by way of reference to the specific embodiments thereof, variations, modifications and equivalents thereto will readily occur to those skilled in the art who have fully understood the contents of the foregoing description. The scope of the invention is therefore to be defined by the appended claims and the equivalents thereto.

The present application is in correspondence to Patent Application No. 2003-173880 filed with Japanese Patent Office on Jun. 18, 2003, and the whole disclosure thereof is incorporated herein by reference.

What is claimed is:

1. A tilt steering assembly comprising a steering column permitting tilt adjustment about a tilt central axis, the tilt steering apparatus further comprising:

at least one electrically conductive support shaft coaxial with the tilt central axis, electrical-conductively assembled to the steering column, and unitarily rotated with the steering column during the tilt adjustment;

an electrically conductive end member provided at an end of the support shaft;

an electrically conductive fixed side plate including a support hole for supporting the support shaft; and an electrically conductive member interposed between the fixed side plate and the end member, and having resilience for bringing the fixed side plate and the end member into electrical conduction;

a bush formed of electrically insulative synthetic material and comprising a tubular portion and a flange disposed at one end of the tubular portion;

wherein the tubular portion is interposed between an inner circumference of the support hole of the fixed side plate and an outer circumference of the support shaft, and the flange is interposed between the steering column and the fixed side plate;

wherein the fixed side plate and the end member of the support shaft are spaced away from each other in an axial direction of the support shaft; and further comprising an electric steering-assist motor;

wherein the electric motor includes a motor housing electrical-conductively mounted on the steering column; and wherein said steering column is grounded by means of the support shaft, the end member, the conductive member and the fixing side plate.

2. A tilt steering assembly according to claim 1, wherein the conductive member is formed from a single sheet metal in one piece.

3. A tilt steering assembly according to claim 1, wherein the support shaft includes a threaded shank fixed in a fixing hole of the steering column further comprising a collar inserted through the support hole of the fixed side plate and surrounding the threaded shank, wherein the collar is clamped between the end member and a side portion of the steering column, and wherein the collar constitutes a metal member, and the bush enclosing a periphery of the collar as rotatably supporting the collar.

4. A tilt steering assembly according to claim 1, further comprising:

a reduction mechanism for reducing an output rotation of the electric motor, wherein the steering column accommodates at least the reduction mechanism and includes a housing conductively assembled to a motor housing of the electric motor, and wherein the support shaft unitarily rotatably assembled to the housing of the steering column.

5. A tilt steering assembly according to claim 4, wherein the at least one support shaft includes a support shaft relatively close to the electric motor and a support shaft relatively far away from the electric motor, the conductive member mounted only to the support shaft close to the electric motor.

6. A tilt steering assembly according to claim 1, wherein the support shaft includes a threaded shank fixed in a fixing hole of the steering column.

7. A tilt steering assembly according to claim 6, wherein the end member includes a head formed from a single member integrally with the threaded shank.

8. A tilt steering assembly according to claim 6, wherein the end member includes a nut threadedly engaged with the threaded shank.

9. A tilt steering assembly according to claim 6, further comprising a collar inserted through the support hole of the fixed side plate and surrounding the threaded shank, wherein the collar is clamped between the end member and a side portion of the steering column.

10. A tilt steering assembly according to claim 1, wherein the end member and the fixed side plate include individual surfaces opposing each other, respectively, wherein the conductive member includes a pair of contact portions individually contacting the respective opposing surfaces of said end member and the fixed side plate, wherein at least one of the pair of contact portions resiliently contacts the corresponding opposing surface.

11. A tilt steering assembly according to claim 10, wherein the conductive member includes a main body having a through hole for insertion of the support shaft therethrough, and a resilient piece extended from the main body, the pair of contact portions provided at the main body and the resilient piece, respectively.

12. A tilt steering assembly according to claim 11, wherein the resilient piece includes a U-shaped portion, the U-shaped portion including a pair of ends each supported by the main body.

13. A tilt steering assembly according to claim 12, wherein the U-shaped portion further includes an intermediate portion interposed between the pair of ends, wherein the pair of ends of the U-shaped portion each includes a first portion inclined relative to the main body, wherein the intermediate portion of the U-shaped portion includes a second portion inclined more gently than the first portion in a free state.

14. A tilt steering assembly according to claim 12, wherein the main body and the intermediate portion of the U-shaped portion are spaced away from each other in a direction along the tilt central axis.

15. A tilt steering assembly according to claim 12, wherein the U-shaped portion and the main body define a U-shaped slit therebetween.

* * * * *